(12) United States Patent
Hull et al.

(10) Patent No.: US 8,077,341 B2
(45) Date of Patent: Dec. 13, 2011

(54) PRINTER WITH AUDIO OR VIDEO RECEIVER, RECORDER, AND REAL-TIME CONTENT-BASED PROCESSING LOGIC

(75) Inventors: Jonathan J. Hull, San Carlos, CA (US); Jamey Graham, San Jose, CA (US); Peter E. Hart, Menlo Park, CA (US)

(73) Assignee: Ricoh Co., Ltd., Tokyo (JP)

( * ) Notice: Subject to any disclaimer, the term of this patent is extended or adjusted under 35 U.S.C. 154(b) by 1217 days.

(21) Appl. No.: 10/813,846

(22) Filed: Mar. 30, 2004

(65) Prior Publication Data

US 2005/0068567 A1 Mar. 31, 2005

Related U.S. Application Data

(60) Provisional application No. 60/506,303, filed on Sep. 25, 2003, provisional application No. 60/506,302, filed on Sep. 25, 2003.

(51) Int. Cl.
*G06K 15/00* (2006.01)
(52) U.S. Cl. ........................ 358/1.18; 358/1.15; 358/1.14
(58) Field of Classification Search .................. 358/1.15, 358/1.14, 400; 348/571, 465; 455/404.1; 340/505
See application file for complete search history.

(56) References Cited

U.S. PATENT DOCUMENTS

| | | | |
|---|---|---|---|
| 4,133,007 A | 1/1979 | Wessler et al. | |
| 4,205,780 A | 6/1980 | Burns et al. | |
| 4,437,378 A | 3/1984 | Ishida et al. | |
| 4,619,522 A | 10/1986 | Imai | |
| 4,635,132 A | 1/1987 | Nakamura | |
| 4,703,366 A | 10/1987 | Kobori et al. | |
| 4,734,898 A | 3/1988 | Morinaga | |
| 4,754,485 A | 6/1988 | Klatt | |
| 4,807,186 A | 2/1989 | Ohnishi et al. | |
| 4,831,610 A | 5/1989 | Hoda et al. | |
| 4,881,135 A | 11/1989 | Heilweil | |
| 4,907,973 A | 3/1990 | Hon et al. | |
| 4,998,215 A | 3/1991 | Black et al. | |

(Continued)

FOREIGN PATENT DOCUMENTS

CA 2386829 11/2002

(Continued)

OTHER PUBLICATIONS

Machine translation of JP 10049761 by Mori, Takami.*

(Continued)

*Primary Examiner* — Charlotte M Baker
*Assistant Examiner* — Lennin Rodriguez
(74) *Attorney, Agent, or Firm* — Patent Law Works LLP

(57) ABSTRACT

A system and method for monitoring events from a media stream and triggering an action in response to detected events. The action is preferably based on information relating to the event received by the system. The system can generate a paper document that reflects some aspects of the detected event such as a summary describing the event. The system can also generate a network message (e.g., email or paging call) in response to the detected event. In other embodiments, the system stores multimedia in memory in response to the detected event. The system can also generate an audio on a speaker or a video on a video display system attached to the printer based on the detected event.

40 Claims, 6 Drawing Sheets

U.S. PATENT DOCUMENTS

| | | | |
|---|---|---|---|
| 5,010,498 | A | 4/1991 | Miyata |
| 5,059,126 | A | 10/1991 | Kimball |
| 5,091,948 | A | 2/1992 | Kametani |
| 5,093,730 | A | 3/1992 | Ishii et al. |
| 5,111,285 | A * | 5/1992 | Fujita et al. .................. 358/500 |
| 5,115,967 | A | 5/1992 | Wedekind |
| 5,136,563 | A | 8/1992 | Takemasa et al. |
| 5,170,935 | A | 12/1992 | Federspiel et al. |
| 5,220,649 | A | 6/1993 | Forcier |
| 5,231,698 | A | 7/1993 | Forcier |
| 5,237,648 | A | 8/1993 | Mills et al. |
| 5,270,989 | A | 12/1993 | Kimura |
| 5,343,251 | A * | 8/1994 | Nafeh .......................... 348/571 |
| 5,386,510 | A | 1/1995 | Jacobs |
| 5,428,555 | A | 6/1995 | Starkey et al. |
| 5,432,532 | A | 7/1995 | Mochimaru et al. |
| 5,436,792 | A | 7/1995 | Leman et al. |
| 5,438,426 | A | 8/1995 | Miake et al. |
| 5,444,476 | A | 8/1995 | Conway et al. |
| 5,479,600 | A | 12/1995 | Wroblewski et al. |
| 5,480,306 | A | 1/1996 | Liu |
| 5,485,554 | A | 1/1996 | Lowitz et al. |
| 5,488,423 | A * | 1/1996 | Walkingshaw et al. ........ 725/24 |
| 5,493,409 | A | 2/1996 | Maeda et al. |
| 5,524,085 | A | 6/1996 | Bellucco et al. |
| 5,566,271 | A | 10/1996 | Tomitsuka et al. |
| 5,568,406 | A | 10/1996 | Gerber |
| 5,572,651 | A | 11/1996 | Weber et al. |
| 5,576,950 | A | 11/1996 | Tonomura et al. |
| 5,581,366 | A * | 12/1996 | Merchant et al. ............ 358/400 |
| 5,590,257 | A | 12/1996 | Forcier |
| 5,596,698 | A | 1/1997 | Morgan |
| 5,617,138 | A | 4/1997 | Ito et al. |
| 5,624,265 | A | 4/1997 | Redford et al. |
| 5,627,936 | A | 5/1997 | Prasad et al. |
| 5,628,684 | A | 5/1997 | Bouedec |
| 5,633,723 | A | 5/1997 | Sugiyama et al. |
| 5,640,193 | A | 6/1997 | Wellner |
| 5,661,506 | A | 8/1997 | Lazzouni et al. |
| 5,661,783 | A | 8/1997 | Assis |
| 5,682,330 | A | 10/1997 | Seaman et al. |
| 5,682,540 | A | 10/1997 | Klotz, Jr. et al. |
| 5,690,496 | A | 11/1997 | Kennedy |
| 5,706,097 | A | 1/1998 | Schelling et al. |
| 5,717,841 | A * | 2/1998 | Farrell et al. ................. 358/1.15 |
| 5,721,883 | A | 2/1998 | Katsuo et al. |
| 5,729,665 | A | 3/1998 | Gauthier |
| 5,749,735 | A | 5/1998 | Redford et al. |
| 5,757,897 | A | 5/1998 | LaBarbera et al. |
| 5,761,380 | A | 6/1998 | Lewis et al. |
| 5,764,235 | A | 6/1998 | Hunt et al. |
| 5,764,368 | A | 6/1998 | Shibaki et al. |
| 5,774,260 | A | 6/1998 | Petitto et al. |
| 5,793,869 | A | 8/1998 | Claflin, Jr. |
| 5,804,803 | A | 9/1998 | Cragun et al. |
| 5,845,144 | A | 12/1998 | Tateyama et al. |
| 5,877,764 | A | 3/1999 | Feitelson et al. |
| 5,884,056 | A | 3/1999 | Steele |
| 5,903,538 | A | 5/1999 | Fujita et al. |
| 5,936,542 | A | 8/1999 | Kleinrock et al. |
| 5,938,727 | A | 8/1999 | Ikeda |
| 5,940,776 | A | 8/1999 | Baron et al. |
| 5,941,936 | A | 8/1999 | Taylor |
| 5,945,998 | A | 8/1999 | Eick |
| 5,949,879 | A | 9/1999 | Berson et al. |
| 5,962,839 | A | 10/1999 | Eskildsen |
| 5,974,189 | A | 10/1999 | Nicponski |
| 5,987,226 | A | 11/1999 | Ishikawa et al. |
| 5,995,553 | A * | 11/1999 | Crandall et al. .............. 375/272 |
| 5,999,173 | A | 12/1999 | Ubillos |
| 6,000,030 | A | 12/1999 | Steinberg et al. |
| 6,006,241 | A | 12/1999 | Purnaveja et al. |
| 6,020,916 | A | 2/2000 | Gersberg et al. |
| 6,038,567 | A | 3/2000 | Young |
| 6,043,904 | A | 3/2000 | Nickerson |
| 6,046,718 | A | 4/2000 | Suzuki et al. |
| 6,076,733 | A | 6/2000 | Wilz, Sr. et al. |
| 6,076,734 | A | 6/2000 | Dougherty et al. |
| 6,081,261 | A | 6/2000 | Wolff et al. |
| 6,098,106 | A | 8/2000 | Philyaw et al. |
| 6,106,457 | A | 8/2000 | Perkins et al. |
| 6,108,656 | A | 8/2000 | Durst et al. |
| 6,111,567 | A | 8/2000 | Savchenko et al. |
| 6,115,718 | A | 9/2000 | Huberman et al. |
| 6,118,888 | A | 9/2000 | Chino et al. |
| 6,123,258 | A | 9/2000 | Iida |
| 6,125,229 | A | 9/2000 | Dimitrova et al. |
| 6,138,151 | A | 10/2000 | Reber et al. |
| 6,141,001 | A | 10/2000 | Baleh |
| 6,148,094 | A | 11/2000 | Kinsella |
| 6,152,369 | A | 11/2000 | Wilz, Sr. et al. |
| 6,153,667 | A | 11/2000 | Howald |
| 6,167,033 | A | 12/2000 | Chang et al. |
| 6,170,007 | B1 | 1/2001 | Venkatraman et al. |
| 6,175,489 | B1 | 1/2001 | Markow et al. |
| 6,189,009 | B1 | 2/2001 | Stratigos et al. |
| 6,193,658 | B1 | 2/2001 | Wendelken et al. |
| 6,195,068 | B1 | 2/2001 | Suzuki et al. |
| 6,199,042 | B1 | 3/2001 | Kurzweil |
| 6,230,189 | B1 | 5/2001 | Sato et al. |
| 6,256,638 | B1 | 7/2001 | Dougherty et al. |
| 6,266,053 | B1 | 7/2001 | French et al. |
| 6,296,693 | B1 | 10/2001 | McCarthy |
| 6,297,812 | B1 | 10/2001 | Ohara et al. |
| 6,297,851 | B1 | 10/2001 | Taubman et al. |
| 6,298,145 | B1 | 10/2001 | Zhang et al. |
| 6,301,586 | B1 | 10/2001 | Yang et al. |
| 6,302,527 | B1 | 10/2001 | Walker |
| 6,307,956 | B1 | 10/2001 | Black |
| 6,308,887 | B1 | 10/2001 | Korman et al. |
| 6,330,976 | B1 | 12/2001 | Dymetman et al. |
| 6,360,057 | B1 | 3/2002 | Tsumagari et al. |
| 6,369,811 | B1 | 4/2002 | Graham et al. |
| 6,373,498 | B1 | 4/2002 | Abgrall |
| 6,373,585 | B1 | 4/2002 | Mastie et al. |
| 6,375,298 | B2 | 4/2002 | Purcell et al. |
| 6,378,070 | B1 | 4/2002 | Chan et al. |
| 6,381,614 | B1 | 4/2002 | Barnett et al. |
| 6,396,594 | B1 | 5/2002 | French et al. |
| 6,400,996 | B1 | 6/2002 | Hoffberg et al. |
| 6,417,435 | B2 | 7/2002 | Chantzis et al. |
| 6,421,738 | B1 | 7/2002 | Ratan et al. |
| 6,439,465 | B1 | 8/2002 | Bloomberg |
| 6,442,336 | B1 | 8/2002 | Lemelson |
| 6,452,615 | B1 | 9/2002 | Chiu et al. |
| 6,466,534 | B2 | 10/2002 | Cundiff, Sr. |
| 6,476,793 | B1 | 11/2002 | Motoyama et al. |
| 6,476,834 | B1 | 11/2002 | Doval et al. |
| 6,502,114 | B1 | 12/2002 | Forcier |
| D468,277 | S | 1/2003 | Sugiyama |
| 6,502,756 | B1 | 1/2003 | Fåhraeus |
| 6,504,620 | B1 | 1/2003 | Kinjo |
| 6,515,756 | B1 | 2/2003 | Mastie et al. |
| 6,519,360 | B1 | 2/2003 | Tanaka |
| 6,529,920 | B1 | 3/2003 | Arons et al. |
| 6,535,639 | B1 | 3/2003 | Uchihachi et al. |
| 6,544,294 | B1 | 4/2003 | Greenfield et al. |
| 6,552,743 | B1 | 4/2003 | Rissman |
| 6,556,241 | B1 | 4/2003 | Yoshimura et al. |
| 6,568,595 | B1 | 5/2003 | Russell et al. |
| 6,581,070 | B1 | 6/2003 | Gibbon et al. |
| 6,587,859 | B2 | 7/2003 | Dougherty et al. |
| 6,593,860 | B2 | 7/2003 | Lai et al. |
| 6,594,377 | B1 | 7/2003 | Kim et al. |
| 6,611,276 | B1 | 8/2003 | Muratori et al. |
| 6,611,622 | B1 | 8/2003 | Krumm |
| 6,611,628 | B1 | 8/2003 | Sekiguchi et al. |
| 6,625,334 | B1 | 9/2003 | Shiota et al. |
| 6,647,534 | B1 | 11/2003 | Graham |
| 6,647,535 | B1 | 11/2003 | Bozdagi et al. |
| 6,654,887 | B2 | 11/2003 | Rhoads |
| 6,665,092 | B2 | 12/2003 | Reed |
| 6,674,538 | B2 | 1/2004 | Takahashi |
| 6,678,389 | B1 | 1/2004 | Sun et al. |
| 6,687,383 | B1 | 2/2004 | Kanevsky et al. |
| 6,700,566 | B2 | 3/2004 | Shimoosawa et al. |
| 6,701,011 | B1 | 3/2004 | Nakajima |

| Patent Number | Date | Inventor(s) |
|---|---|---|
| 6,701,369 B1 | 3/2004 | Philyaw |
| 6,724,494 B1 | 4/2004 | Danknick |
| 6,728,466 B1 | 4/2004 | Tanaka |
| 6,745,234 B1 | 6/2004 | Philyaw et al. |
| 6,750,978 B1 | 6/2004 | Marggraff et al. |
| 6,753,883 B2 | 6/2004 | Schena et al. |
| 6,771,283 B2 | 8/2004 | Carro |
| 6,772,947 B2 | 8/2004 | Shaw |
| 6,774,951 B2 | 8/2004 | Narushima |
| 6,775,651 B1 | 8/2004 | Lewis et al. |
| 6,807,303 B1 | 10/2004 | Kim et al. |
| 6,824,044 B1 | 11/2004 | Lapstun et al. |
| 6,845,913 B2 | 1/2005 | Madding et al. |
| 6,853,980 B1 | 2/2005 | Ying et al. |
| 6,856,415 B1 | 2/2005 | Simchik et al. |
| 6,871,780 B2 | 3/2005 | Nygren et al. |
| 6,877,134 B1 | 4/2005 | Fuller et al. |
| 6,883,162 B2 | 4/2005 | Jackson et al. |
| 6,886,750 B2 | 5/2005 | Rathus et al. |
| 6,892,193 B2 | 5/2005 | Bolle et al. |
| 6,898,709 B2 | 5/2005 | Teppler |
| 6,904,168 B1 | 6/2005 | Steinberg et al. |
| 6,904,451 B1 | 6/2005 | Orfitelli et al. |
| 6,923,721 B2 | 8/2005 | Luciano et al. |
| 6,931,594 B1 | 8/2005 | Jun |
| 6,938,202 B1 | 8/2005 | Matsubayashi et al. |
| 6,946,672 B1 | 9/2005 | Lapstun et al. |
| 6,950,623 B2 | 9/2005 | Brown et al. |
| 6,964,374 B1 | 11/2005 | Djuknic et al. |
| 6,966,495 B2 | 11/2005 | Lynggaard et al. |
| 6,983,482 B2 | 1/2006 | Morita et al. |
| 7,000,193 B1 | 2/2006 | Impink, Jr. et al. |
| 7,023,459 B2 | 4/2006 | Arndt et al. |
| 7,031,965 B1 | 4/2006 | Moriya et al. |
| 7,073,119 B2 | 7/2006 | Matsubayashi et al. |
| 7,075,676 B2 | 7/2006 | Owen |
| 7,079,278 B2 | 7/2006 | Sato |
| 7,089,156 B2 | 8/2006 | Takayasu et al. |
| 7,089,420 B1 | 8/2006 | Durst et al. |
| 7,092,568 B2 | 8/2006 | Eaton |
| 7,131,058 B1 | 10/2006 | Lapstun et al. |
| 7,134,016 B1 | 11/2006 | Harris |
| 7,149,957 B2 | 12/2006 | Hull et al. |
| 7,151,613 B1 * | 12/2006 | Ito ................................ 358/1.15 |
| 7,152,206 B1 | 12/2006 | Tsuruta |
| 7,162,690 B2 | 1/2007 | Gupta et al. |
| 7,174,151 B2 * | 2/2007 | Lynch et al. ............... 455/404.1 |
| 7,181,502 B2 | 2/2007 | Incertis |
| 7,196,808 B2 | 3/2007 | Kofman et al. |
| 7,215,436 B2 | 5/2007 | Hull et al. |
| 7,225,158 B2 | 5/2007 | Toshikage et al. |
| 7,228,492 B1 | 6/2007 | Graham |
| 7,260,828 B2 | 8/2007 | Aratani et al. |
| 7,263,659 B2 | 8/2007 | Hull et al. |
| 7,263,671 B2 | 8/2007 | Hull et al. |
| 7,280,738 B2 | 10/2007 | Kauffman et al. |
| 7,298,512 B2 | 11/2007 | Reese et al. |
| 7,305,620 B1 | 12/2007 | Nakajima et al. |
| 7,313,808 B1 | 12/2007 | Gupta et al. |
| 7,363,580 B2 | 4/2008 | Tabata et al. |
| 7,647,555 B1 | 1/2010 | Wilcox et al. |
| 2001/0003846 A1 | 6/2001 | Rowe et al. |
| 2001/0017714 A1 | 8/2001 | Komatsu et al. |
| 2001/0037408 A1 | 11/2001 | Thrift et al. |
| 2001/0052942 A1 | 12/2001 | MacCollum et al. |
| 2002/0001101 A1 | 1/2002 | Hamura et al. |
| 2002/0004807 A1 | 1/2002 | Graham et al. |
| 2002/0006100 A1 | 1/2002 | Cundiff Sr., et al. |
| 2002/0010641 A1 | 1/2002 | Stevens et al. |
| 2002/0011518 A1 | 1/2002 | Goetz et al. |
| 2002/0015066 A1 | 2/2002 | Siwinski et al. |
| 2002/0019982 A1 | 2/2002 | Aratani et al. |
| 2002/0023957 A1 | 2/2002 | Michaelis et al. |
| 2002/0048224 A1 | 4/2002 | Dygert et al. |
| 2002/0051010 A1 | 5/2002 | Jun et al. |
| 2002/0060748 A1 | 5/2002 | Aratani et al. |
| 2002/0066782 A1 | 6/2002 | Swaminathan et al. |
| 2002/0067503 A1 | 6/2002 | Hiatt |
| 2002/0078149 A1 | 6/2002 | Chang et al. |
| 2002/0087530 A1 | 7/2002 | Smith et al. |
| 2002/0087598 A1 | 7/2002 | Carro |
| 2002/0095501 A1 | 7/2002 | Chiloyan et al. |
| 2002/0099534 A1 | 7/2002 | Hegarty |
| 2002/0101343 A1 * | 8/2002 | Patton ............................ 340/505 |
| 2002/0101513 A1 | 8/2002 | Halverson |
| 2002/0131071 A1 | 9/2002 | Parry |
| 2002/0131078 A1 | 9/2002 | Tsukinokizawa |
| 2002/0134699 A1 | 9/2002 | Bradfield et al. |
| 2002/0135800 A1 | 9/2002 | Dutta |
| 2002/0137544 A1 | 9/2002 | Myojo |
| 2002/0140993 A1 | 10/2002 | Silverbrook |
| 2002/0159637 A1 | 10/2002 | Echigo et al. |
| 2002/0165769 A1 | 11/2002 | Ogaki et al. |
| 2002/0169849 A1 | 11/2002 | Schroath |
| 2002/0171857 A1 | 11/2002 | Hisatomi et al. |
| 2002/0185533 A1 | 12/2002 | Shieh et al. |
| 2002/0199149 A1 | 12/2002 | Nagasaki et al. |
| 2003/0002068 A1 | 1/2003 | Constantin et al. |
| 2003/0007776 A1 | 1/2003 | Kameyama et al. |
| 2003/0014615 A1 | 1/2003 | Lynggaard |
| 2003/0024975 A1 | 2/2003 | Rajasekharan |
| 2003/0025951 A1 | 2/2003 | Pollard et al. |
| 2003/0038971 A1 | 2/2003 | Renda |
| 2003/0046241 A1 | 3/2003 | Toshikage et al. |
| 2003/0051214 A1 | 3/2003 | Graham et al. |
| 2003/0065925 A1 | 4/2003 | Shindo et al. |
| 2003/0076521 A1 | 4/2003 | Li et al. |
| 2003/0084462 A1 | 5/2003 | Kubota et al. |
| 2003/0086720 A1 | 5/2003 | Song |
| 2003/0088582 A1 | 5/2003 | Pflug |
| 2003/0093384 A1 | 5/2003 | Durst et al. |
| 2003/0110926 A1 | 6/2003 | Sitrick et al. |
| 2003/0117652 A1 | 6/2003 | Lapstun |
| 2003/0121006 A1 | 6/2003 | Tabata et al. |
| 2003/0128877 A1 | 7/2003 | Nicponski |
| 2003/0146927 A1 | 8/2003 | Crow et al. |
| 2003/0160898 A1 | 8/2003 | Baek et al. |
| 2003/0164898 A1 * | 9/2003 | Imai ............................. 348/465 |
| 2003/0177240 A1 | 9/2003 | Gulko et al. |
| 2003/0187642 A1 | 10/2003 | Ponceleon et al. |
| 2003/0218597 A1 | 11/2003 | Hodzic |
| 2003/0220988 A1 | 11/2003 | Hymel |
| 2003/0231198 A1 | 12/2003 | Janevski |
| 2004/0024643 A1 | 2/2004 | Pollock et al. |
| 2004/0036842 A1 | 2/2004 | Tsai et al. |
| 2004/0039723 A1 | 2/2004 | Lee et al. |
| 2004/0044894 A1 | 3/2004 | Lofgren et al. |
| 2004/0049681 A1 | 3/2004 | Diehl et al. |
| 2004/0064207 A1 | 4/2004 | Zacks et al. |
| 2004/0118908 A1 | 6/2004 | Ando et al. |
| 2004/0125402 A1 | 7/2004 | Kanai et al. |
| 2004/0128514 A1 | 7/2004 | Rhoads |
| 2004/0128613 A1 | 7/2004 | Sinisi |
| 2004/0143459 A1 | 7/2004 | Engleson et al. |
| 2004/0143602 A1 | 7/2004 | Ruiz et al. |
| 2004/0150627 A1 | 8/2004 | Luman et al. |
| 2004/0156616 A1 | 8/2004 | Strub et al. |
| 2004/0167895 A1 | 8/2004 | Carro |
| 2004/0184064 A1 | 9/2004 | TaKeda et al. |
| 2004/0207876 A1 | 10/2004 | Aschenbrenner et al. |
| 2004/0215470 A1 | 10/2004 | Bodin |
| 2004/0229195 A1 | 11/2004 | Marggraff et al. |
| 2004/0240541 A1 | 12/2004 | Chadwick et al. |
| 2004/0240562 A1 | 12/2004 | Bargeron et al. |
| 2004/0249650 A1 | 12/2004 | Freedman et al. |
| 2005/0034057 A1 | 2/2005 | Hull et al. |
| 2005/0038794 A1 | 2/2005 | Piersol |
| 2005/0064935 A1 | 3/2005 | Blanco |
| 2005/0068569 A1 | 3/2005 | Hull et al. |
| 2005/0068581 A1 | 3/2005 | Hull et al. |
| 2005/0083413 A1 | 4/2005 | Reed et al. |
| 2005/0125717 A1 | 6/2005 | Segal et al. |
| 2005/0149849 A1 | 7/2005 | Graham et al. |
| 2005/0213153 A1 | 9/2005 | Hull et al. |
| 2005/0216838 A1 | 9/2005 | Graham |
| 2005/0216852 A1 | 9/2005 | Hull et al. |
| 2005/0225781 A1 | 10/2005 | Koizumi |
| 2005/0229107 A1 | 10/2005 | Hull et al. |

| | | | |
|---|---|---|---|
| 2005/0231739 | A1 | 10/2005 | Lee et al. |
| 2005/0262437 | A1 | 11/2005 | Patterson et al. |
| 2006/0013478 | A1 | 1/2006 | Ito et al. |
| 2006/0043193 | A1 | 3/2006 | Brock |
| 2006/0092450 | A1 | 5/2006 | Kanazawa et al. |
| 2006/0136343 | A1 | 6/2006 | Coley et al. |
| 2006/0171559 | A1 | 8/2006 | Rhoads |
| 2006/0250585 | A1 | 11/2006 | Anderson et al. |
| 2007/0033419 | A1 | 2/2007 | Kocher et al. |
| 2007/0065094 | A1 | 3/2007 | Chien et al. |
| 2007/0109397 | A1 | 5/2007 | Yuan et al. |
| 2007/0162858 | A1 | 7/2007 | Hurley et al. |
| 2007/0168426 | A1 | 7/2007 | Ludwig et al. |
| 2007/0234196 | A1 | 10/2007 | Nicol et al. |
| 2007/0268164 | A1 | 11/2007 | Lai et al. |
| 2008/0037043 | A1 | 2/2008 | Hull et al. |
| 2008/0246757 | A1 | 10/2008 | Ito |

FOREIGN PATENT DOCUMENTS

| | | |
|---|---|---|
| CN | 1352765 A | 6/2002 |
| CN | 1097394 C | 12/2002 |
| EP | 0651556 | 5/1995 |
| EP | 0743613 | 11/1996 |
| EP | 1079313 A2 | 2/2001 |
| EP | 1133170 A2 | 9/2001 |
| JP | 60-046653 | 3/1985 |
| JP | 01-172900 | 7/1989 |
| JP | 04-225670 | 8/1992 |
| JP | 05-101484 | 4/1993 |
| JP | 06-124502 | 5/1994 |
| JP | 07-160445 | 6/1995 |
| JP | H07-284033 | 10/1995 |
| JP | 08-002015 | 1/1996 |
| JP | 08-69419 | 3/1996 |
| JP | 08-160985 | 6/1996 |
| JP | H09-037180 | 2/1997 |
| JP | H10-049761 | 2/1998 |
| JP | 10-126723 | 5/1998 |
| JP | H11-341423 | 12/1999 |
| JP | 2000190575 | 7/2000 |
| JP | 2000352995 | 12/2000 |
| JP | 2001-228994 | 8/2001 |
| JP | 2001324988 | 11/2001 |
| JP | 2002178565 | 6/2002 |
| JP | 2002344636 | 11/2002 |
| JP | 2003005790 | 1/2003 |
| JP | 2003-87458 | 3/2003 |
| JP | 2003-513564 | 4/2003 |
| JP | 2003-514318 | 4/2003 |
| JP | 2003-177776 | 6/2003 |
| WO | WO9806098 | 2/1998 |
| WO | WO 99/18523 | 4/1999 |
| WO | WO0073875 | 12/2000 |
| WO | WO 02/082316 A1 | 10/2002 |

OTHER PUBLICATIONS

ASCII 24.com, [online] (date unknown), Retrieved from the Internet<URL: http://216.239.37.104/search?q=cache:z-G9M1EpvSUJ:ascii24.com/news/i/hard/article/1998/10/01/612952-000.html+%E3%82%B9%E3%...>.

Configuring a Printer (NT), Oxford Computer Support [online] [Retrieved on Nov. 13, 2003] Retrieved from the Internet<URL: http://www.nox.ac.uk/cehoxford/ccs/facilities/printers/configent.htm>.

"DocumentMall Secure Document Management" [online] [Retrieved on Mar. 9, 2004). Retrieved from the Internet <URL: http://www.documentmall.com>.

Girgensohn, Andreas et al., "Time-Constrained Keyframe Selection Technique," Multimedia Tools and Applications (2000), vol. 11, pp. 347-358.

Graham, Jamey et al., "A Paper-Based Interface for Video Browsing and Retrieval," IEEE International Conference on Multimedia and Expo (Jul. 6-9, 2003), vol. 2, P:II 749-752.

Graham, Jamey et al., "The Video Paper Multimedia Playback System," Proceedings of the 11$^{th}$ ACM International Conference on Multimedia (Nov. 2003), pp. 94-95.

Graham, Jamey et al., "Video Paper: A Paper-Based Interface for Skimming and Watching Video," International Conference on Consumer Electronics (Jun. 16-18, 2002), pp. 214-215.

Hull, Jonathan J. et al., "Visualizing Multimedia Content on Paper Documents: Components of Key Frame Selection for Video Paper," Proceedings of the 7$^{th}$ International Conference on Document Analysis and Recognition (2003), vol. 1, pp. 389-392.

"Kofax: Ascent Capture: Overview" [online] [Retrieved on Jan. 22, 2004]. Retrieved form the Internet: <URL" http://www.kofax.com/products/ascent/capture>.

Label Producer by Maxell, [online] [Retrieved on Nov. 11, 2003]. Retrieved from the Internet<URL: http://www.maxell.co.jp/products/consumer/rabel_card/>.

Movie-PhotoPrint by Canon, [online] [Retrieved on Nov. 11, 2003]. Retrieved from the Internet<URL: http://cweb.canon.jp/hps/guide/rimless.html>.

PostScript Language Document Structuring Conventions Specification, Version 3.0 (Sep. 25, 1992), Adobe Systems Incorporated.

Print From Cellular Phone by Canon, [online] [Retrieved on Nov. 11, 2003]. Retrieved from the Internet<URL: http://cweb.canon.jp/bj/enjoy/pbeam/index.html>.

Print Images Plus Barcode by Fuji Xerox, [online] [Retrieved on Nov. 11, 2003]. Retrieved from the Internet<URL: http://www.fujixerox.co.jp/soft/cardgear/release.html>.

Print Scan-Talk by Barcode by Epson, [online] [Retrieved on Nov. 11, 2003]. Retrieved from the Internet<URL: http://www.epson.co.jp/osirase/2000/000217.htm>.

Printer With CD/DVD Tray, Print CD/DVD Label by Epson, [online] [Retrieved on Nov. 11, 2003]. Retrieved from the Internet<URL: http://www.i-love-epson.co.jp/products/printer/inkjet/pmd750/pmd7503.htm>.

R200 ScanTalk [online] (date unknown). Retrieved from the Internet<URL: http://homepage2.nifty.com/vasolza/ScanTalk.htm>.

Variety of Media in, Print Paper Out by Epson, [online] [Retrieved on Nov. 11, 2003]. Retrieved from the Internet<URL: http://www.i-love-epson.co.jp/products/spc/pma850/pma8503.htm>.

Poon, K.M. et al., "Performance Analysis of Median Filtering on Meiko™—A Distributed Multiprocessor System," IEEE First International Conference on Algorithms and Architectures for Parallel Processing, 1995, pp. 631-639.

Communication Pursuant to Article 96(2) EPC, European Application No. 04255836.1, Jun. 11, 2007, 10 pages.

Stifelman, L. et al., "The Audio Notebook," SIGCHI 2001, Mar. 31-Apr. 5, 2001, pp. 182-189, vol. 3, No. 1, Seattle, WA.

Dimitrova, N. et al., "Applications of Video-Content Analysis and Retrieval," IEEE Multimedia; Jul.-Sep. 2002, pp. 42-55.

European Search Report, EP 04255836, Sep. 12, 2006, 4 pages.
European Search Report, EP 04255837, Sep. 5, 2006, 3 pages.
European Search Report, EP 04255839, Sep. 4, 2006, 3 pages.
European Search Report, EP 04255840, Sep. 12, 2006, 3 pages.

Graham, J. et al., "A Paper-Based Interface for Video Browsing and Retrieval," ICME '03, Jul. 6-9, 2003, pp. 749-752, vol. 2.

Graham, J. et al., "Video Paper: A Paper-Based Interface for Skimming and Watching Video," ICCE '02, Jun. 18-20, 2002, pp. 214-215.

Klemmer, S.R. et al., "Books With Voices: Paper Transcripts as a Tangible Interface to Oral Histories," CHI Letters, Apr. 5-10, 2003, pp. 89-96, vol. 5, Issue 1.

Minami, K. et al., "Video Handling with Music and Speech Detection," IEEE Multimedia, Juy-Sep. 1998, pp. 17-25.

Shahraray, B. et al, "Automated Authoring of Hypermedia Documents of Video Programs," ACM Multimedia '95 Electronic Proceedings, San Francisco, CA, Nov. 5-9, 1995. pp. 1-12.

Shahraray, B. et al., "Pictorial Transcripts: Multimedia Processing Applied to Digital Library Creation," IEEE, 1997, pp. 581-586.

Chinese Application No. 2004100849823 Office Action, Jun. 1, 2007, 24 pages.

Chinese Application No. 2004100897988 Office Action, Apr. 6, 2007, 8 pages.

Lamming, M. et al., "Using Automatically Generated Descriptions of Human Activity to Index Multi-media Data," IEEE Multimedia Communications and Applications IEE Colloquium, Feb. 7, 1991, pp. 5/1-5/3.

Gropp, W. et al., "Using MPI-Portable Programming with the Message Passing Interface," copyright 1999, pp. 35-42, second edition, MIT Press.

Print From Cellular Phone by Canon, [online] [Retrieved on Nov. 11, 2003]. Retrieved from the Internet<URL: http://cweb.canon.jp/bj/enjoy/pbeam/index.html>.

Print Images Plus Barcode by Fuji Xerox, [online] [Retrieved on Nov. 11, 2003]. Retrieved from the Internet<URL: http://www.fujixerox.co.jp/soft/cardgear/release.html>.

Print Scan-Talk by Barcode by Epson, [online] [Retrieved on Nov. 11, 2003]. Retrieved from the Internet<URL: http://www.epson.co.jp/osirase/2000/000217.htm>.

Gopal, S. et al., "Load Balancing in a Heterogeneous Computing Environment," Proceedings of the Thirty-First Hawaii International Conference on System Sciences, Jan. 6-9, 1998.

Gropp, W. et al., "Using MPI—Portable Programming with the Message-Passing Interface," copyright 1999, pp. 35-42, second edition, MIT Press.

"Seiko Instruments USA, Inc.—Business and Home Office Products" online, date unknown, Seiko Instruments USA, Inc., [retrieved on Jan. 25, 2005]. Retrieved from the Internet: <URL: http://www.siibusinessproducts.com/products/link-ir-p-html>.

"Tasty FotoArt" [online], date unknown, Tague Technologies, Inc., [retrieved on Mar. 8, 3005]. Retrieved from the Internet: <URL: http//www.tastyfotoart.com>.

Brown et al., "A Diary Study of Information Capture in Working Life," Proceedings of ACM CHI 2000 Conference on Human Factors in Computing Systems, 2000, pp. 438-445, vol. 1.

U.S. Appl. No. 10/660,867, filed Sep. 12, 2003, Erol et al.

Erol, Berna et al., "Linking Multimedia Presentations With Their Symbolic Source Documents: Algorithm and Applications," ACM Multimedia '03, Nov. 2-8, 2003, pp. 498-507, Berkeley, CA.

Erol, Berna et al., "Prescient Paper: Multimedia Document Creation With Document Image Matching," 17$^{th}$ International Conference on Pattern Recognition, Aug. 2004, 4 pages, Cambridge, U.K.

Erol, Berna et al, "Retrieval of Presentation Recordings With Digital Camera Images," IEE Conference on Computer Vision and Pattern Recognition (CVPR), Jun. 27-Jul. 2, 2004, 2 pages, Washington, D.C.

Hardman, L. et al, "Integrating the Amsterdam Hypermedia Model with the Standard Reference Model for Intelligent Multimedia Presentation Systems," Computer Standards & Interfaces, 1997, pp. 497-507, vol. 18.

Karasik, D. "Image Processing in Perl Graphic Applications," Google, Apr. 2, 2003, pp. 1-12.

Lauesen, S., "User Interface Design: A Software Engineering Perspective," 2005, 28 pages.

Lienhart, Rainer et al., "Localizing and Segmenting Text in Images and Videos," IEEE Transactions on Circuits and Systems for Video Technology, Apr. 2002, pp. 256-268, vol. 12, No. 4.

"Microsoft Powerpoint—Wikipedia, the free encyclopedia," Wikimedia Foundation, Inc., [online] [Retrieved on Nov. 7, 2006] Retrieved from the internet <URL:http://en.wikipedia.org/wiki/Microsoft_PowerPoint>.

Otsu, N., "A Threshold Selection method From Gray-Level Histograms," IEEE Transactions on Systems, Man and Cybernetics, Jan. 1979, pp. 62-66, vol. SMC-9, No. 1.

Srihari, S.N. et al., "Name and Address Block Reader System for Tax Form Processing," IEEE, 1995, pp. 5-10.

U.S. Appl. No. 09/714,785, filed Nov. 15, 2000.

Boreczky, J. et al., "An Interactive Comic Book Presentation for Exploring Video," CHI Letters, Apr. 1-6, 2000, pp. 185-192, vol. 2, Issue 1.

Buchanan, M.C. et al., "Multimedia Documents as User Interfaces," INTERCHI '93, Amsterdam, The Netherlands, Apr. 24-29, 1993, pp. 527-528.

Harada, K. et al., "Anecdote: A Multimedia Storyboarding System with Seamless Authoring Support," ACM Multimedia '96, Boston, MA, 1996, pp. 341-351.

MacKay, W. et al., "Augmenting Reality: Adding Computational Dimensions to Paper," Communications of the ACM, Jul. 1993, pp. 96-97, vol. 36, No. 7.

MacKay, W. et al., "Video Mosaic: Laying Out Time in a Physical Space," Multimedia '94, San Francisco, CA, Oct. 1994, pp. 165-172.

Makedon, F. et al., "Multimedia Authoring, Development Environments and Digital Video Editing," Dartmouth College Technical Report, PCS-TR94-231, 2001, pp. 1-24.

Nelson, L. et al, "Palette: A Paper Interface for Giving Presentations," CHI '99, May 1999, pp. 1-8.

Roschelle, J. et al., "VideoNoter: A Productivity Tool for Video Data Analysis," Behavior Research Methods, Instruments & Computers, 1991, pp. 219-224, vol. 23, No. 2.

Tonomura, Y. et al., "VideMAP and VideoSpaceIcon," INTERCHI '93, Amsterdam, The Netherlands, Apr. 24-29, 1993, pp. 131-136 and 544.

Wellner, P., "Interacting with Paper on the DigitalDesk," Communications of the ACM, Jul. 1993, pp. 87-96, vol. 36, No. 7.

U.S. Appl. No. 09/714,785, filed Nov. 15, 2000, Hull et al.

Karasik, D., Image Processing in Perl graphic applications, Google Apr. 2, 2003, pp. 1-12.

Arai, T. et al., "PaperLink: A Technique for Hyperlinking from Real Paper to Electronic Content," CHI 97, Atlanta, GA, Mar. 22-27, 1997, pp. 327-334.

Dorai, C. et al., "End-to-End VideoText Recognition for Multimedia Content Analysis," IEEE, International Conference on Multimedia and Expo, Aug. 2001, pp. 601-604.

Hecht, D.L., "Printed Embedded Data Graphical User Interfaces," Computer, Mar. 2001, pp. 47-55, vol. 34, Issue 3.

Klemmer, S.R. et al., "Books with Voices: Paper Transcripts as a Tangible Interface to Oral Histories," CHI 2003, Fort Lauderdale, FL, Apr. 5-10, 2003, pp. 89-96.

Groot, M., "Multimedia Projectors: A Key Component in the Classroom of the Future," T.H.E. Journal Online, Jun. 2002, pp. 1-4, [Online] [Retrieved on Jul. 1, 2002] Retrieved from the Internet<URL:http://www.thejournal.com/magazine/vault/A4056.cfm>.

Shelbourn, M., et al., "Multimedia in Construction Education: New Dimensions," Automation in Construction, 2001, pp. 265-274, vol. 10, Elsevier.

Japanese Office Action, Japanese Application No. 2004-278353, Aug. 11, 2009, 3 pages.

Ueno, M. et al., "Multimedia Information EPG and its Use: A Proposal of Multimedia EPG", Proceedings of the Institute of Electronics, Information and Communication Engineers (IEICE) General Conference, Basic/Boundary, Mar. 6, 1998, pp. 357 (7 pages including translation).

Mulhern, P. et al., "Pivot Vector Space Approach for Audio-Video Mixing," IEEE Multimedia, Apr.-Jun. 2003, pp. 28-40, vol. 10, Issue 2.

Srinivasan, U. et al., "Multi-Modal Feature-Map: An Approach to Represent Digital Video Sequences," Visual '99, LNCS 1614, 1999, pp. 299-306, Springer-Verlag, Berlin, Germany.

United States Office Action, U.S. Appl. No. 10/814,844, Sep. 11, 2009, 23 pages.

Japanese Office Action, Japanese Application No. 2004-278346, Feb. 16, 2010, 2 pages.

Japanese Office Action, Japanese Application No. 2004-278349, Feb. 2, 2010, 2 pages.

Tonomura, Y. et al., "Structured Video Computing," IEEE Multimedia, Sep. 1994, pp. 34-43, vol. 1, Issue 3.

European Search Report, Application No. EP 04255847.8-1247/1526442, 4 pages.

United States Office Action, U.S. Appl. No. 11/094,887, Jul. 21, 2010, 44 pages.

Japanese Office Action, Japanese Application No. JP2004-278356, Aug. 10, 2010, 4 pages.

Japanese Office Action, Japanese Application No. JP2004-278347, Aug. 31, 2010, 2 pages.

United States Notice of Allowance, U.S. Appl. No. 10/814,842, Aug. 18, 2010, 8 pages.

United States Notice of Allowance, U.S. Appl. No. 10/814,944, Aug. 23, 2010, 10 pages.

United States Office Action, U.S. Appl. No. 12/334,303, Sep. 21, 2010, 47 pages.

European Communication, EP Application No. 04 255 847.8, Sep. 21, 2010, 6 pages.
United States Office Action, U.S. Appl. No. 11/094,887, Jan. 6, 2011, 70 pages.
Japanese Office Action, Japanese Patent Application No. 2004-278346, Jan. 18, 2011, 2 pages.
United States Office Action, U.S. Appl. No. 12/334,303, Mar. 10, 2011, 17 pages.
United States Office Action, U.S. Appl. No. 11/094,887, Jul. 22, 2011, 21 pages.
United States Office Action, U.S. Appl. No. 12/334,303, Aug. 5, 2011, 8 pages.
European Office Action, European Patent Application No. 04 255 839.5, Jun. 17, 2011, 5 pages.

* cited by examiner

PRINTER WITH AUDIO OR VIDEO RECEIVER, RECORDER, AND REAL-TIME CONTENT-BASED PROCESSING LOGIC

RELATED APPLICATIONS

This application claims priority from U.S. Provisional Patent Application entitled "Printer Including One or More Specialized Hardware Devices" filed on Sep. 25, 2003, having Ser. No. 60/506,303, and U.S. Provisional Patent Application entitled "Printer Including Interface and Specialized Information Processing Capabilities" filed on Sep. 25, 2003, having Ser. No. 60/506,302, each of which is incorporated by reference herein in its entirety.

This application is also related to the following applications, each of which was filed on Mar. 30, 2004 and each of which is incorporated by reference herein in its entirety: application Ser. No. 10/814,931, entitled "Printer Having Embedded Functionality for Printing Time-Based Media," application serial No. 10/814,700, entitled "Printer User Interface," and application Ser. No. 10/814,932, entitled "Printer With Hardware and Software Interfaces for Media Devices,".

BACKGROUND

1. Field of the Invention

The present invention relates generally to document printers and more particularly to systems and methods that can monitor an event and trigger an action in response.

2. Background of the Invention

Monitoring of a live video and/or audio feed is desirable in many situations. For example, a person may wish to monitor a live radio or television feed for weather-related events such as the Emergency Alert System (EAS) issued by the Federal Communications Commission (FCC) to state and local broadcasters. A person may also wish to monitor user-defined events such as the appearance of a specified set of keywords in the closed caption of a TV broadcast, or the appearance of a given image (e.g., the face of Jonathan Hull) in a video stream, or the occurrence of an audio event (e.g., gun shot) in an audio stream.

The monitoring of such events typically requires the individual monitoring of live audio or video broadcasts, or the monitoring of recordings of the broadcasts. This can be both inefficient and tedious for the person performing the monitoring, and for a live broadcast, it requires the person to be present during the broadcast. Moreover, monitoring of a recorded broadcast may delay delivery of critical information.

What is needed is a system and method for monitoring media feeds for a specified event and alert the user of the event.

SUMMARY OF THE INVENTION

The present invention overcomes the deficiencies and limitations of the prior art by providing a system and method for a printer that can detect specified events from a media feed and trigger an action in response.

The action is preferably based on information relating to the event received by the system. In one embodiment, the system generates a paper document that reflects some aspects of the detected event such as a summary describing the event. In a second embodiment, the system generates a network message (e.g., email or paging call) in response to the detected event. In a third embodiment, the system stores multimedia in memory in response to the detected event. In a fourth embodiment, the system can generate audio on a speaker or video on a video display system attached to the printer based on the detected event. In all of these embodiments, the system performs an action (in addition to or instead of printing) in accordance with information relating to the event.

In certain embodiments, the system interacts with the user or the media source before the printer performs the action in accordance with information relating to the detected event.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTIONS OF THE DRAWINGS

The invention has other advantages and features which will be more readily apparent from the following detailed description of the invention and the appended claims, when taken in conjunction with the accompanying drawings, in which:

DETAILED DESCRIPTION OF THE PREFERRED EMBODIMENTS

A preferred embodiment of the present invention is now described with reference to the figures where like reference numbers indicate identical or functionally similar elements. Also in the figures, the left most digit(s) of each reference number typically correspond(s) to the figure in which the reference number is first used. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment," "certain embodiments" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Figure 1A:
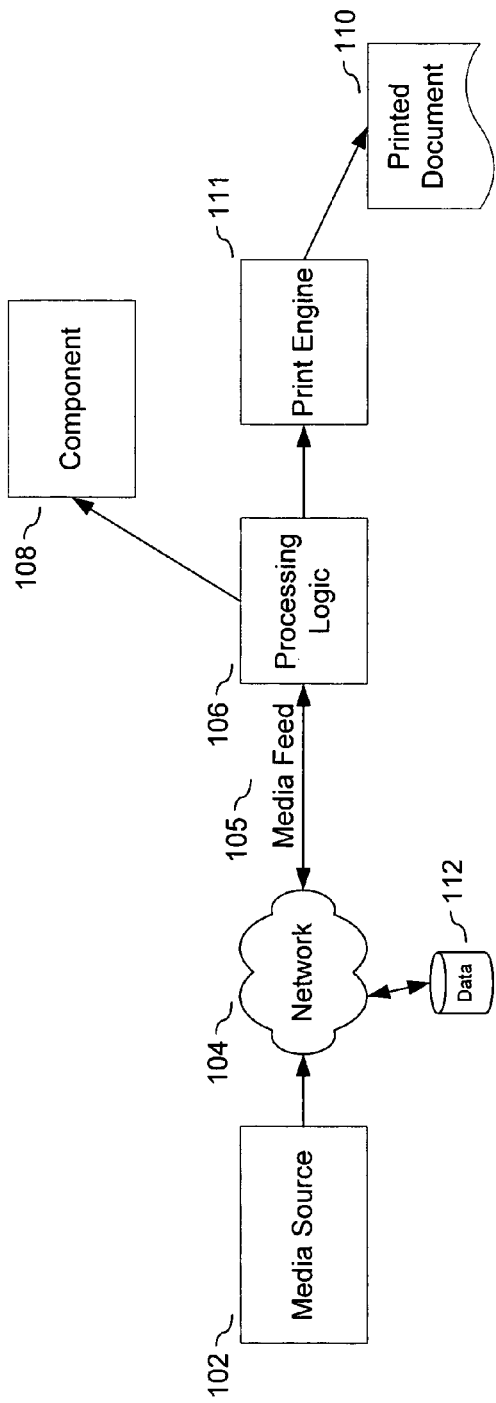
FIG. 1(a) is a block diagram showing a system usable in connection with the present invention.

Now referring to FIG. 1(a), there is shown a system that is usable in connection with the present invention. A media feed is sent from a media source 102 to a processing logic 106. As used herein, the term "media feed" refers to anything in the print stream sent to the printer, including both printing and non-printing data. In an embodiment, a media feed may comprise the closed caption of a television broadcast, a digital media file (such as MPEG movies, Quicktime video, MP3 audio, WAV audio), or audio or video streams such as those obtained from a radio or television broadcast. In certain embodiments, the media source 102 may comprise a receiver for receiving a media feed and a recorder for recording the media feed. A receiver may be coupled to an antenna, a satellite dish, and/or a cable line for receiving radio, television, satellite broadcasts, and/or cable television broadcasts.

In FIG. 1(a), the media feed 105 is sent over a network 104, such as the internet, an intranet, a wireless connection, a wide area network, or the like. The processing logic 106 receives the media feed 105 and performs an action based on an event that is triggered by the monitoring of the media feed. The processing logic 106 contains decision logics to monitor the media feed 105 based on a user-defined event or a pre-defined event. As used herein, an "event" refers to anything (e.g., sounds, images, text, etc.) the system is monitoring. Examples of events include tone sequences or digital data embedded in a broadcast signal that is indicative of National Weather Service (NWS) or the Emergency Alert System (EAS) alerts but could also include user-defined events such as the appearance of a specified set of keywords in the closed caption a TV broadcast, or the appearance of a given image (e.g., face image of Jonathan Hull) in a video stream, or the occurrence of a sound (e.g., gun shot) in an audio stream.

The action performed by the processing logic 106 may be any of a number of actions, such as entering data in a database, sending a notification or confirmation, adding data to a web page, etc. One example of an action performed by the processing logic 106 is to send data to a component 108. The component 108 may comprise a cell phone, a pager, an email engine, a database, a speaker, a video display unit, a storage element, and the like. Thus, for example, an event detected by the processing logic 106 may trigger the processing logic 106 to generate audio on a speaker coupled to the processing logic 106 based on the event detected in the input audio or video streams. In another embodiment, the processing logic 106 might respond to an event detected in the input audio or video stream by populating a webpage located on a database with information relating to the event. In other embodiments, the processing logic 106 may generate a network message (e.g., an email or paging call). The email or webpage could contain a textual representation for the event and the time when it occurred or it could contain a document (e.g. an Adobe Acrobat file) that describes the event. In certain embodiments, the processing logic 106 could extract information (such as time of the event, a textual description of the event, or a graphic representation of the event) from the media feed 105 or from other sources located on the network 104. For example, the processing logic 106 may be programmed to gather information regarding an EAS alert from certain web pages located on the Internet that contain information on the EAS alert. In other situations, the processing logic may obtain information regarding a detected event from a database 112 located on the network 104.

In certain embodiments, the processing logic 106 also generates a document in response to a detected event and causes a print engine 111 to print the document 110 describing or summarizing information associated with the detected event. Again, the information describing the event could be gathered from the media feed 105 or from a source on the network 104.

It will be understood that the actions performed by the processing logic 106 as described above are examples only. It will be understood that other responses are possible. For example, video could be generated on a video display (e.g., showing a television broadcast) in response to an event detected by the processing logic 106.

Figure 1B:
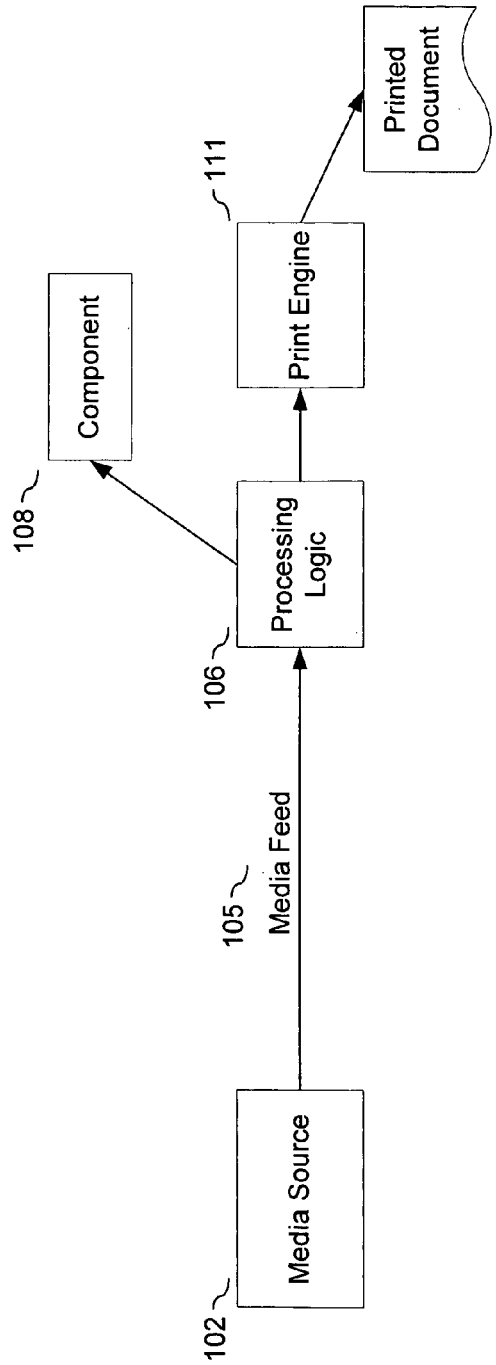
FIG. 1(b) is a block diagram showing a system usable in connection with the present invention.

FIG. 1(b) is a block diagram showing a system usable in connection with the present invention. In this example, the media source 102 is coupled to the processing logic 106 without a network connection. Similarly, the processing logic 106 is connected to the component 108 without a network connection. In this embodiment, the media source 102 and the processing logic 106 may reside on a single unit or multiple units.

Figure 1C:
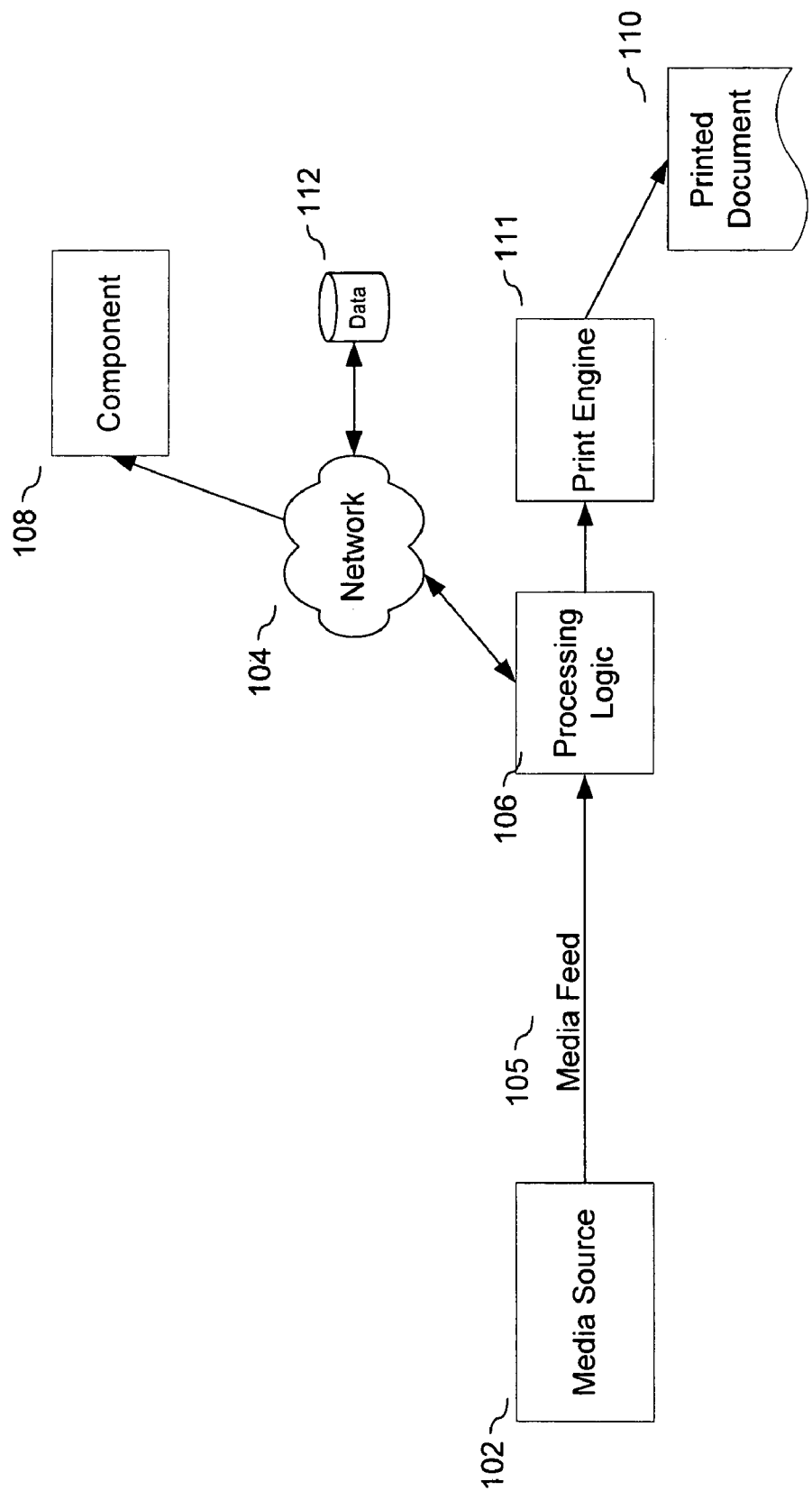
FIG. 1(c) is a block diagram showing a system usable in connection with the present invention.

FIG. 1(c) is a block diagram showing a system usable in connection with the present invention. In this example, the processing logic 106 is connected to the component 108 using a network connection through the network 104. The network 104 can be any network, such as the Internet, an intranet, a wireless network connection, a wide area network, or the like.

It will be understood that the system configurations shown in FIGS. 1(a)-1(c) are examples only and are included to show some configurations usable with the present invention. It will be understood that other configurations are possible. For example, the connections between the media source 102 and the processing logic 106 and between the processing logic 106 and the component 108 can both be network connections.

Figure 2:
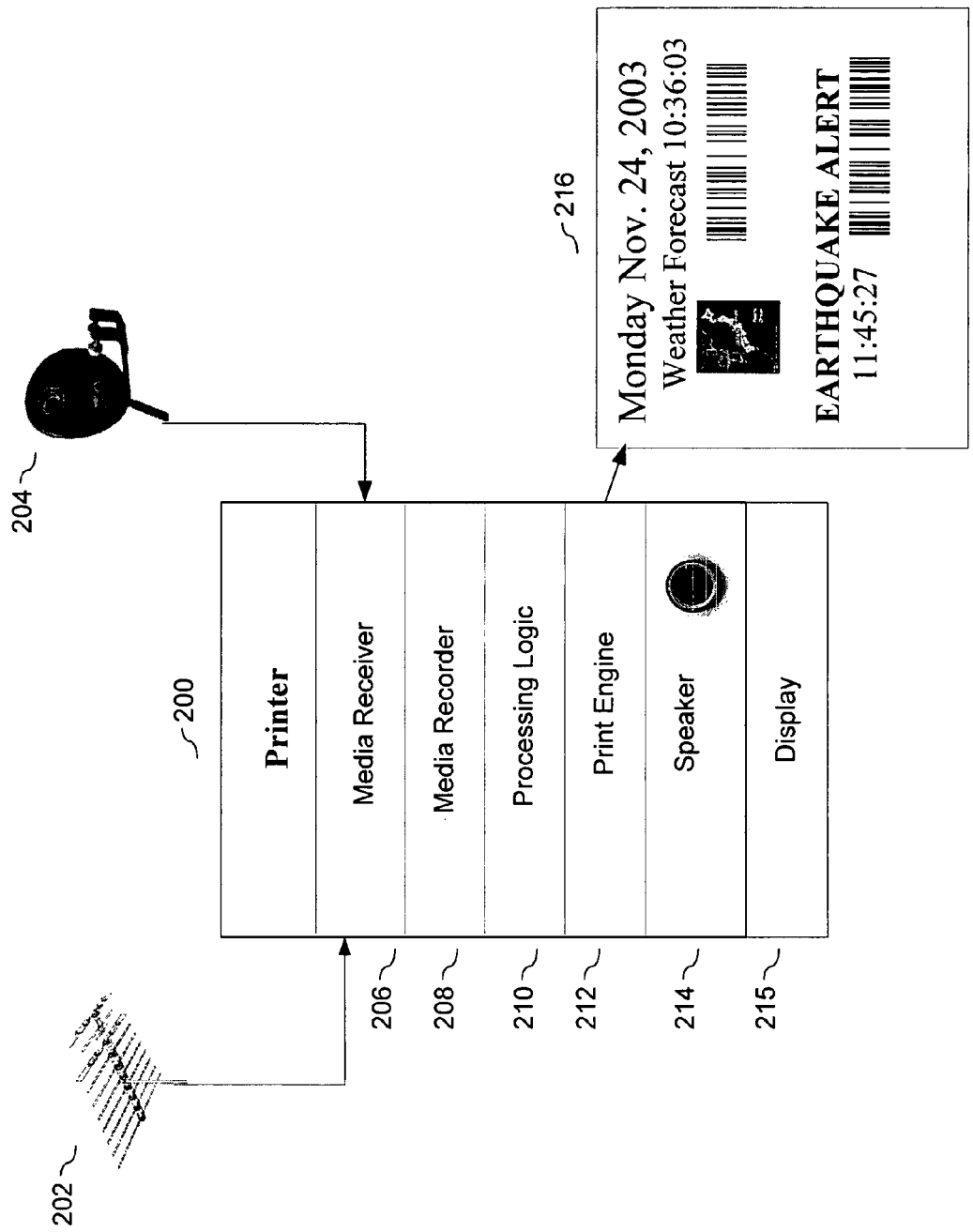
FIG. 2 illustrates a printer with an embedded audio and video receiver and recorder, according to an embodiment of the present invention.

Now referring to FIG. 2, there is shown an embodiment of a printer 200 wherein the audio and video receiver and recorder are embedded in the printer 200. In FIG. 2, the printer 200 comprises a media receiver 206, a media recorder 208, a processing logic 210, a print engine 212, a speaker 214, and a display 215 (touch screen and/or video display capable of displaying a media feed). The media receiver 206 comprises a radio, television, satellite, and/or cable receiver. The receiver obtains media broadcasts through various means, including an antenna 202, a satellite dish 204, and/or a cable line (not shown). A media feed from a media broadcast is recorded on the media recorder 208. The media recorder 208 may record audio or video feeds. The processing logic 210 monitors the media feed from the media recorder 208 for a pre-defined or user-defined event. When an event is detected the processing logic 210 causes the print engine 212 to print a document 216 describing the event. In certain embodiments, the processing logic may also cause audio to be played on the speaker 214 in response to an event.

Printed document 216 illustrates an embodiment of the present invention wherein the system is used to detect NWS and/or EAS alerts. In this embodiment, the processing logic 210 contains Tone sequence decoding logic to detect tone sequences or digital data embedded in the media that are indicative of an NWS or an EAS alert. The processing logic 210 generates a document indicating the date and time of the alert (in this example, an earthquake alert at 11:45) and a weather forecast. The processing logic 210 can extract information regarding the alert from the media feed or from other sources such as Internet web pages with information relating to the event, as described above. Moreover, as illustrated, the description of the event could contain textual representations as well as graphics representations. In this example, the processing logic 210 obtains key frames from the media feed and causes the print engine 212 to print a document 216 with bar codes linking the key frames to different segments of a video file that may be used to replay a recorded video describing the event. Closed caption texts from the media feed may also be printed alongside the video key frames to describe the event. The processing logic 210 may also cause audio relating to the NWS or EAS alert to be played on the speaker 214 (e.g., tune into a radio station with weather alert). Live video could also be played on the speaker 214 or the display 215 either as the result of an event being detected or in response to commands that were entered on the console or on the web interface.

Figure 3:
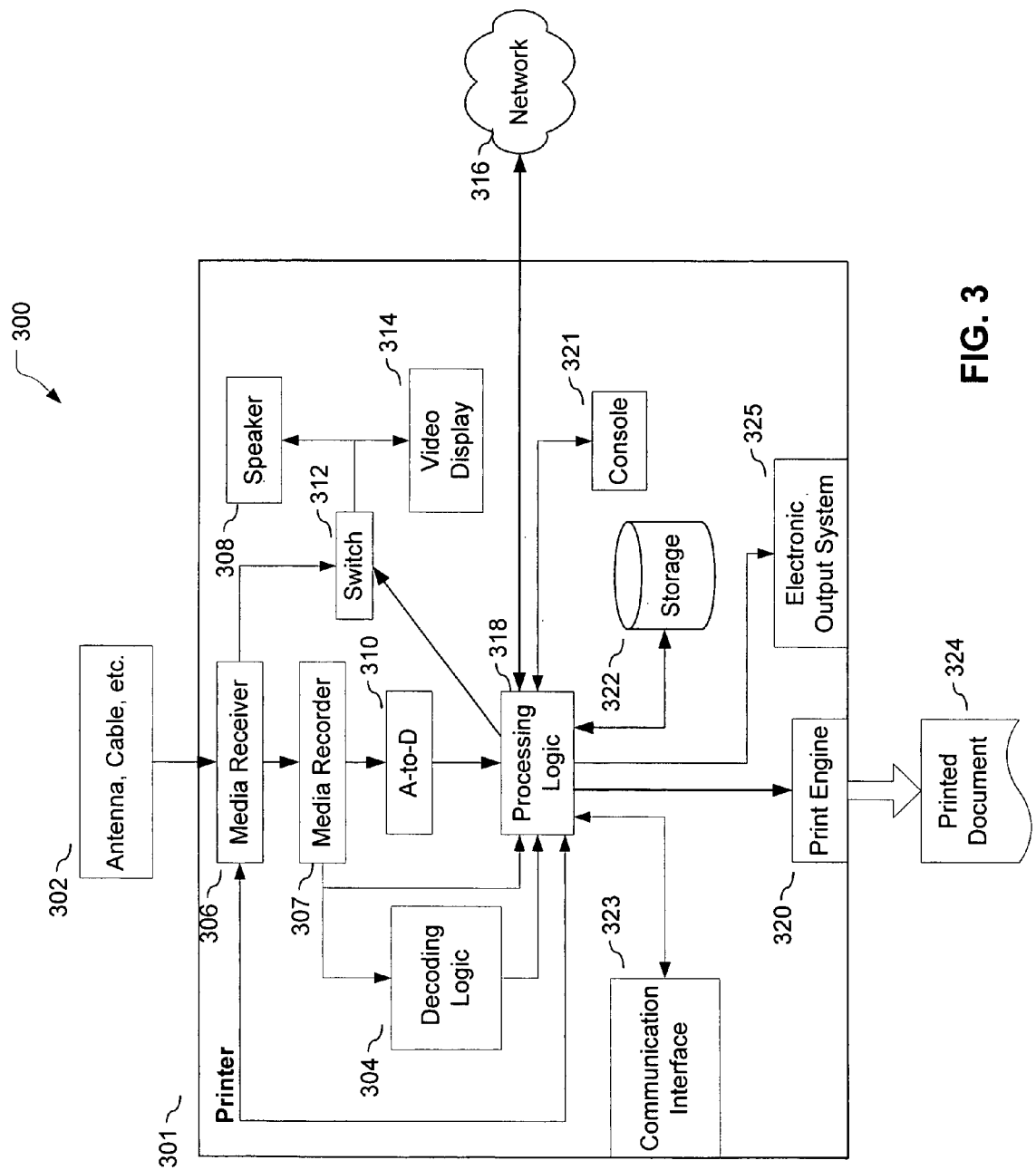
FIG. 3 is a block diagram showing a system with a printer having embedded components for detecting events, according to an embodiment of the present invention.

FIG. 3 illustrates another embodiment of the present invention. The system 300 includes a printer 301, means for receiving media broadcasts 302 coupled to the printer 301, a network 316 coupled to the printer 301, and a printed document 324 generated by the printer 301. In this embodiment, the printer 301 contains an embedded media receiver 306, media recorder 307, tone sequence decoding logic 304, processing logic 318, print engine 320, storage 322, console 321, audio and video display systems 308 and 314, electronic output system 325, and communication port 323 including parallel, serial, USB, and network connections that receive the page description data that allow the printer 301 to function as a normal printer in the absence of any media, as illustrated in FIG. 3.

The means for receiving media broadcasts 302 is coupled to the media receiver 306. In an embodiment, the system 300 could receive media broadcasts via an antenna, a satellite dish, and/or a cable wire. Thus, the system 300 could receive one frequency or multiple frequencies simultaneously. In such an embodiment, the receiver 306 could receive television, radio, cable television, and/or satellite broadcasts. The media receiver 306 is coupled to the media recorder 307, which records the media broadcasts obtained from the receiver 306. In other embodiments, the media receiver 306 is coupled to the processing logic 318, thereby allowing media feeds form the media receiver 306 to be directly processed by the processing logic 318.

Live media feeds from the media recorder 307 are coupled to the decoding logic 304 decoding logic 304 decodes tone sequences and digital data embedded in a broadcast signal such as the EAS alerts issued by the FCC broadcasts, an NWS alert or an Emergency Broadcast System (EBS) alert. These tone sequences or embedded digital data may correspond to a myriad of emergency alerts, weather-related warnings and other information issued by the FCC or other branches of the government. Those skilled in the art will recognize that the decoding logic 304 could be implemented using a digital signal processor (DSP) or a general-purpose processor. FIG. 3 illustrates the decoding logic 304 as a separate unit from the processing logic 318, and the decoding logic 304 is coupled to the processing logic 318. It will be understood that the decoding logic 304 could also be embedded in the processing logic 318.

In an embodiment, the media recorder 307 provides a live media feed to the processing logic 318. If the media feed is in analog format, the analog-to-digital converter 310 can convert the analog signal to a digital format before feeding the media signal to the processing logic 318. In certain embodiments, the video feed can be sent to the processing logic via the network 316. As described above, the processing logic 318 monitors the media feed for a user-defined or pre-programmed event. Once an event is detected, the processing logic 318 may gather additional information about the event. For example, it may extract information about the event from a preprogrammed Internet website located on the network 316, or it may capture additional information from a preprogrammed video feed located on the network 316 or the storage 322, or it may extract information from the media feed itself The processing logic 318 can then generate a summary of the event. The processing logic 318 could generate a document that summarizes the event and send it to the print engine 320 to produce a printed document 324. The processing logic could also generate a network message (e.g., an email or a paging call) over the network 316 in response to the detected event. The network message could contain information about the event. The processing logic 318 could also store the information about the event in the storage 322. In certain situations (such as an EAS weather alert), the processing logic 318 could respond by controlling switch 312 to allow broadcasting of the media feed of the event on speaker 308 and/or video display 314. For example, a radio announcement of an EAS weather alert could be played on speaker 308. In another example, upon a receipt of an EAS alert, the processing logic 318 could request the local NEXRAD satellite image from a specified web address, a web cam picture from a certain location, and construct an Adobe Acrobat file with a textual description of the event and the time it occurred. Those skilled in the art will recognize that other responses to a detect event could be generated.

In other embodiments, the printer 301 includes an electronic output system 325 that can be designed to produce an electronic output related to the multimedia data in any desired format. Because of the great variety of types and formats of electronic outputs, the electronic output system 325 may take any of a number of forms for producing an electronic output desired by the user. For example, the electronic output system 325 may comprise a removable media device with a media writer (e.g., a writeable DVD or CD, flash card, memory stick, and the like), an audio speaker, a video display system, a storage device, and the like. In particular implementations, the printer 301 may have only one or only a subset of the various components shown, and in addition it may have other types of not shown.

In another embodiment, the printer 301 includes a communication interface 323 that allows the printer 301 to be communicatively coupled to another electronic device. Depending on the desired input, the interface 305 may allow the printer 301 to communicate with a wide variety of different peripheral devices that can provide the printer 301 multimedia data to print. Without intending to limit the types of devices, the interface 323 may allow the printer 301 to received media data from peripheral devices such as computer systems, computer networks, digital cameras, cellular telephones, PDA devices, video cameras, media renderers (such as DVD and CD players), media receivers (such as televisions, satellite receivers, set-top boxes, radios, and the like), digital video recorders (such as a TiVO), a portable meeting recorder, external storage devices, video game systems, or any combination thereof. The connection type for the interface 323 can take a variety of forms based on the type of device that is intended to be connected to the printer 301 and the available standard connections for that type of device. For example, the interface 323 may comprise a port for connecting the device using a connection type such as USB, serial, FireWire, SCSI, IDE, RJ11, parallel port (e.g., bidirectional, Enhanced Parallel Port (EPP), Extended Capability Port (ECP), IEEE 1284 Standard parallel port), optical, composite video, component video, or S-video, or any other suitable connection type.

The printer 301 also contains a user interface console 321 that is coupled to the processing logic 318. In certain embodiments, the user interface console 321 allows the user to define events to be monitored by the processing logic 318, and it allows the user to program the processing logic 318 to respond to specific events in specific manners. For example, a user can use console 321 to program the processing logic 318 to monitor EAS events. The user could also program the processing logic to generate and print a document summarizing any detected EAS event. The user could program the processing logic 318 to extract information from a specified Internet website whenever a specific event is detected. The user could also program the processing logic 318 to trigger the speaker 308 to broadcast a preprogrammed radio station that has information about the EAS alert when an EAS event is detected. It will be understood that a user could program other events and responses. For example, the system 300 could be used to monitor the appearance of specified set of keywords in the closed caption of a television broadcast, or the appearance of a given image in a video stream, or the occurrence of a specified sound in an audio stream. Moreover, those skilled in the art will also recognize that the system 300 may be designed to automatically detect certain events and provide certain responses without user interactions.

In certain embodiments, the printer 301 could also be controlled remotely via the network 316. For example, the printer 301 could be controlled by a web page located on the network 316 that is supplied when the user enters the Internet address for the printer 301 in a web browser. The user could enter descriptions of events that the processing logic 318 should monitor and the expected responses to the events. In another embodiment, the processing logic 318 can also run a web server using a database on the storage 322.

In other embodiments, the printer 301 could be controlled by a print dialog box that pops up when the user sends any documents to the printer 301. One of the options available to the user is to print a template document where that template shows what events are to be detected and the appearance of the document that is generated in response to those events.

Although system 300 depicts various elements (e.g., media receiver 306, media recorder 307, processing logic 318, decoding logic 304, print engine 320, console 321, speaker 308, etc.) as being embedded in the printer 301, it will be understood that in alternative embodiments these elements may reside as separate units. For example, the processing logic 318 and the Tone sequence decoding logic 304 may be a single separate unit coupled to another unit containing the print engine 320, or the media receiver 306 and recorder 307 may be a single unit coupled to a unit containing the processing logic, or the speakers and video display may be separate units, and the like.

The printer 301 may include other embodiments of the electronic output system 325, the communication interface 323, and any number of embedded elements described in co-pending U.S. patent application entitled, "Printer Having Embedded Functionality for Printing Time-Based Media," filed Mar. 30, 2004, which application is incorporated by reference in its entirety.

An advantage of the present invention is the ability to monitor a live media feed for certain events. For example, the system 300 can perform live monitoring of the content of radio or television broadcasts and generate printouts and storage of multimedia in response to detected events. In a preferred embodiment, the present invention as exemplified in system 300 can monitor events that occur when the user is not present. The instant generation of a paper output or a network message when events occur allows the user to pick up a print-out off the printer or review the network message at any later time without needing to press any other buttons or do anything else. Those events can be summarized very well with a paper document that is easy to browse. The utility of paper printouts may increase as more events occur since a paper representation can be easier to browse than an online representation. Also, the paper will be there if a power failure occurs after it is printed. As described above, the system can also generate electronic versions of the paper summaries and email them to users.

Figure 5:
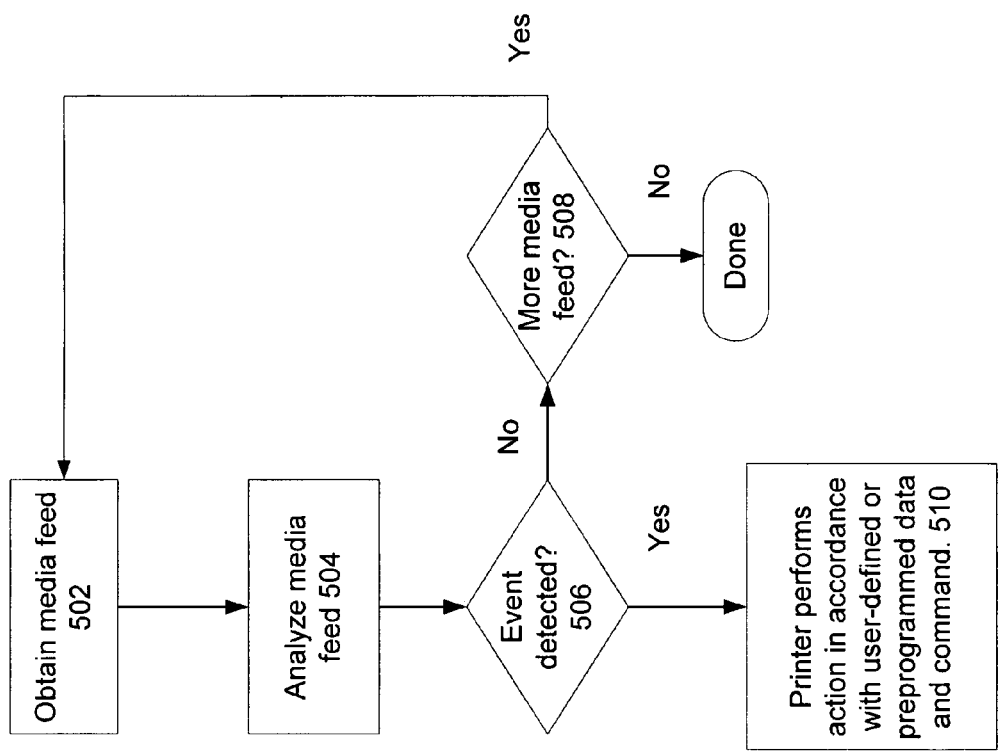
FIG. 5 is a flowchart corresponding to an embodiment of FIG. 3.

FIG. 5 illustrates a method that is useable in connection with the system 300. The printer 301 obtains media feed from a media source, step 502. Depending on the event that is being monitored, the decoding logic 304 and/or the processing logic 504 will analyze the media feed for detection of the event, step 504. For example, if the system 300 is programmed to monitor EAS alerts, the decoding logic 304 will decode EAS event codes from the media feed, and the processing logic 504 will generate responses to detected EAS events. If the system 300 is programmed to monitor other events such as appearance recognition in a video feed, the processing logic 504 will analyze the feed for event detection. If an event is detected, the printer will perform actions in accordance with user-defined and/or preprogrammed data and commands, step 506 and 510, as described above. If no event is detected, the printer 301 will continue to monitor the media feed unless there is no more video feed to monitor, step 508.

Interactive Communication with a Printer

Figure 4:
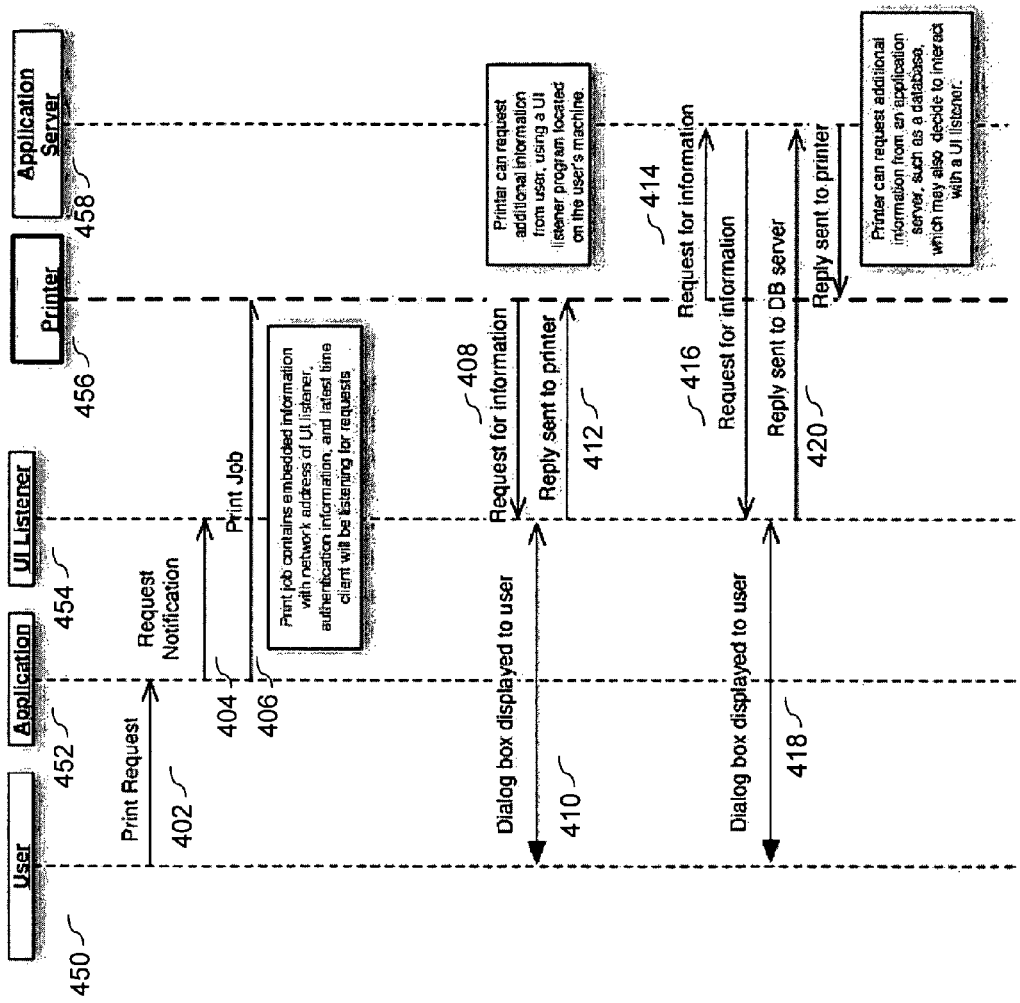
FIG. 4 shows an example of interactive communication with a printer in accordance with the present invention.

FIG. 4 shows an example of interactive communication with a printer in accordance with the present invention.

In general, conventional printer drivers in modern operating systems are not designed to facilitate interactive information gathering. Because the print job can be redirected to another printer, or the printing protocol does not allow such interactive sessions, the operating system does not encourage interaction with the user. Once initial printer settings are captured, further interactions are generally not allowed in conventional printers. One approach to this problem is to embed metadata into the print stream itself, as noted above. However, it is possible that the printer could need to ask the user for more information, in response to computations made from the data supplied by the user. In addition, the printer might itself delegate some tasks to other application servers, which might in turn need more information from the user. So-called "Web services" or "grid computing" systems are examples of the sort of application server that the printer might trigger.

In order to allow this interaction, without modifying printer driver architecture of the underlying operating system, an extra mechanism, such as the one shown in FIG. 4, is constructed. A "UI Listener," program 454 listens to a network socket, accepts requests for information 408, interacts with a user to obtain such data, and then sends the data back to the requester.

Once a print request 402 is sent by user 450 and notification 404 requested from the UI listener 454, the print job 406 is sent by application 452. Here, the print job 406 contains embedded information including the network address of the UI listener 454, authentication information, and the latest time that the client will be listening for requests.

If the printer requires additional information of confirmation, it sends a request 408, which is detected by the UI listener, which displays a dialog box to obtain input from the user 410. An example of such a request might be a request for a password or user confirmation code that the user must enter to access a database 458. The user's input is included in a reply 412 sent to the printer. If the reply does not satisfy the printer it may ask for additional information (not shown). If the reply does satisfy the printer, it takes a next step. This step might be to perform an external action such as sending an email (not shown). The next step might also be sending a request for information 414 to an application server (such as a database) 458. In this example, application server 458 also sends a request for information 416, which is detected by the UI listener. The user is prompted 418 and his response forwarded to the application server 420. In this example, a reply is then sent form the application server 458 to the printer 456. It will be understood that a particular embodiment may include either or none or requests 408 and 416 without departing from the spirit of the present invention.

A program such as that shown in FIG. 4 may have a fixed set of possible interactions, or may accept a flexible command syntax that allows the requester to display many different requests. An example of such a command syntax would be the standard web browser's ability to display HTML forms. These forms are generated by a remote server, and displayed by the browser, which then returns results to the server. In this embodiment, however, the UI listener is different from a browser in that a user does not generate the initial request to see a form. Instead, the remote machine generates this request. In the described embodiment, the UI listener is a server, not a client.

Because network transactions of this type are prone to many complex error conditions, a system of timeouts would be necessary to assure robust operation. Normally, each message sent across a network either expects a reply or is a one-way message. Messages which expect replies generally have a timeout, a limited period of time during which it is acceptable for the reply to arrive. In this embodiment, embedded metadata would include metadata about a UI listener that will accept requests for further information. Such metadata preferably includes at least a network address, port number, and a timeout period. It might also include authentication information, designed to prevent malicious attempts to elicit information from the user. Because the user cannot tell whether the request is coming from a printer, a delegated server, or a malicious agent, prudence suggests strong authentication by the UI listener. If the printer or a delegated application server wishes more information, it can use the above noted information to request that the UI listener ask a user for the needed information.

Examples of Printers with Embedded Media Devices

Printer with Embedded National Weather Service Radio Alert Receiver

The printer 301 includes a radio receiver (e.g., 306) tuned to the National Weather Service frequency as well as a tone decoding circuit (e.g., 304) that can recognize the tone signals used to indicate an alert message. This printer 301 can construct a log of all the alerts it hears and print that log, it can also apply speech recognition in an attempt to construct a printable representation for the alert message. It can also ring a bell and audibly play the alert message on a speaker attached to the printer. It can also send an email message or Internet paging message to the registered owner or owners of the printer.

Printer with Embedded TV Emergency Alert System (EBS) Alert Monitor

The printer 301 includes a cable TV (or broadcast TV) receiver (e.g., 306) tuned to a "responsible" local station known to broadcast EAS alerts, as well as a tone decoding circuit (e.g., 304) that can recognize the tone signals used to indicate an alert message. This printer can construct a log of all the alerts it hears and print that log, it also does a frame grab and saves a copy of the screen image associated with the alert message, it can also apply speech recognition in an attempt to construct a printable representation for the alert message that includes the image grabbed from the TV signal. It can also ring a bell and audibly play the alert message on a speaker 308 attached to the printer. This obviates the need for the user to have the TV turned on to receive the alert. It can also send an email message or Internet paging message to the registered owner or owners of the printer.

Printer with Embedded Audio Recorder

The printer 301 is plugged in to an audio source and it's recorded onto an internal disk. The printer generates a summary of what's on the disk. Optionally, this is a Video Paper document.

Printer with Embedded Video Recorder

The printer 301 is plugged in to an audio source and it's recorded onto an internal disk. The printer generates a summary of what's on the disk. Optionally, this is a Audio Paper document.

Printer with Embedded Single-channel TV Receiver

The user can walk up to the printer 301 and dial in a TV channel (e.g., on user interface console 321). The current program appears on a small monitor (e.g., 314) on the printer. The user can stand there and watch TV and at any point choose to print a keyframe. This can also be controlled from a print dialog box.

Printer with Embedded Single-channel AM/FM/Shortwave Radio Receiver

The user can walk up to the printer 301, dial in a radio station (e.g., on user interface console 321), listen to what's being broadcast, and at any point choose to print a document that shows the time when the button was pushed as well as a waveform for the audio.

Printer with Embedded Single-channel Satellite Radio Receiver

The user can walk up to the printer 301 and dial in a satellite TV channel (e.g., on user interface console 321). Note that the printer must also be connected to a satellite TV antenna (e.g., 302). The current program appears on a small monitor on the printer. The user can stand there and watch TV and at any point choose to print a key frame. This can also be controlled from a print dialog box.

Printer with Embedded Multi-channel TV Receiver

The user can watch more than one channel at the same time (like on PIP Picture In Picture TV sets) and choose to print key frames from any of the available sources.

Printer with Embedded Multi-channel AM/FM/Shortwave Radio Receiver

The user can listen to more than one channel at the same time, perhaps using a stereo speaker system (e.g., 308) on the printer 301, and selectively choose to print a document that shows a time stamp for when the button was pushed.

Printer with Embedded Multi-channel Satellite Radio Receiver

The user can watch more than one satellite TV channel at the same time (like on PIP Picture In Picture TV sets) and choose to print key frames from any of the available sources. Note: the printer 301 must be plugged into more than one satellite TV antenna (e.g., 302).

Upon reading this disclosure, those skilled in the art will appreciate still alternative systems and methods with the disclosed principles of the present invention for detecting specified events from a media feed and triggering an action in response. Thus, while particular embodiments and applications of the present invention have been illustrated and described, it is to be understood that the invention is not limited to the precise construction and components disclosed herein and that various modifications, changes and variations, which will be apparent to those skilled in the art, may be made in the arrangement, operation and details of the method and apparatus of the present invention disclosed herein without departing from the spirit and scope of the invention as defined in the appended claims.

We claim:

1. A printer for printing time-based media from a broadcast media feed, the printer comprising:
    a broadcast media receiver for receiving and outputting the broadcast media feed of time-based media;
    a content-based processing logic coupled to the broadcast media receiver for monitoring the broadcast media feed of time-based media to detect an occurrence of an event within the broadcast media feed, the content-based processing logic processing the broadcast media feed to generate an electronic representation and a printable representation of the broadcast media feed responsive to detecting the occurrence of the event, the printable representation and the electronic representation including a time of occurrence of the event, a graphical representation of the event and a barcode linking the graphical representation to a corresponding segment of a recorded media feed describing the event;
    a first output device in communication with the content-based processing logic to receive the electronic representation, the first output device automatically producing a corresponding electronic output from the received electronic representation of the broadcast media feed responsive to detecting the occurrence of the event; and
    a second output device in communication with the content-based processing logic to receive the printable representation, the second output device automatically producing a corresponding printed output from the received printable representation of the broadcast media feed responsive to the generation of the printable representation.

2. The printer of claim 1, wherein the printed output is generated in a video paper format.

3. The printer of claim 1, wherein the printed output is generated in an audio paper format.

4. The printer of claim 1, wherein the electronic representation including the graphical representation of the event comprises an email message.

5. The printer of claim 1, wherein the corresponding electronic output comprises at least one selected from the group consisting of a network message, audio related to the broadcast media feed, a modified web page comprising information related to the event, and video related to the broadcast media feed.

6. The printer of claim 5, wherein the network message comprises an email message.

7. The printer of claim 5, wherein the network message comprises a paging message.

8. The printer of claim 1, wherein the content-based processing logic is user-programmable to indicate the event to be monitored.

9. The printer of claim 1, wherein the content-based processing logic is user-programmable to indicate a response to be generated.

10. The printer of claim 1, wherein the content-based processing logic extracts data from a web page responsive to detecting the occurrence of the event.

11. The printer of claim 1, wherein the content-based processing logic extracts data from the broadcast media feed responsive to detecting the occurrence of the event.

12. The printer of claim 11, wherein the content-based processing logic extracts closed caption text from the broadcast media feed.

13. The printer of claim 11, wherein the content-based processing logic extracts key frames from a video feed.

14. The printer of claim 1, further comprising the content-based processing logic broadcasting a video feed responsive to detecting the occurrence of the event.

15. The printer of claim 1, further comprising the processing logic broadcasting an audio feed on a speaker responsive to detecting the occurrence of the event.

16. The printer of claim 1, wherein the broadcast media feed comprises live media feed.

17. The printer of claim 1, further comprising a media recorder for recording the broadcast media feed.

18. The printer of claim 1, wherein the event comprises a coded signal embedded in the broadcast media feed.

19. The printer of claim 18, wherein the coded signal corresponds to an emergency alert system (EAS) alert.

20. The printer of claim 18, wherein the coded signal corresponds to a national weather service (NWS) alert.

21. The printer of claim 18, wherein the coded signal corresponds to an emergency broadcast system (EBS) alert.

22. The printer of claim 18, further comprising a decoder for decoding the coded signal.

23. The printer of claim 18, wherein the coded signal comprises a digital data embedded in the broadcast media feed.

24. The printer of claim 18, wherein the coded signal comprises a tone sequence embedded in the broadcast media feed.

25. The printer of claim 1, wherein the event comprises an appearance of an image in the broadcast media feed.

26. The printer of claim 1, wherein the broadcast media feed comprises an audio stream.

27. The printer of claim 1, wherein the broadcast media feed comprises a video stream.

28. The printer of claim 1, wherein the media receiver comprises a receiving means selected from a group of an antenna, a satellite dish, and a cable line.

29. The printer of claim 1, wherein the media receiver is adapted to receive media signals at multiple frequencies simultaneously.

30. The printer of claim 1, wherein the event comprises an occurrence of a specified sound in the broadcast media feed.

31. A method for printing time-based media from a broadcast media feed, the method comprising:
    receiving the broadcast media feed of time-based media;
    monitoring the broadcast media feed of time-based media to detect an occurrence of an event within the broadcast media feed;
    processing the broadcast media feed to generate an electronic representation of the broadcast media feed and a printable representation of the broadcast media feed responsive to detecting the occurrence of the event, the printable representation and the electronic representation including a time of occurrence of the event, a graphical representation of the event and a barcode linking the graphical representation to a corresponding segment of a recorded media feed describing the event;

responsive to detecting the occurrence of the event, automatically generating a corresponding electronic output from the electronic representation of the broadcast media feed; and responsive to the generation of the printable representation, automatically generating a corresponding printed output from the printable representation of the broadcast media feed.

32. The method of claim 31 further comprising generating an email message from the electronic representation of the broadcast media feed.

33. The method of claim 31 further comprising generating a network message responsive to detecting the occurrence of the event.

34. The method of claim 31 further comprising defining the event to be monitored.

35. The method of claim 31 further comprising extracting data from a web page responsive to detecting the occurrence of the event.

36. The method of claim 31, wherein processing the broadcast media feed comprises extracting closed caption text from the media feed.

37. The method of claim 31, wherein processing the broadcast media feed comprises extracting key frames from a video feed.

38. The method of claim 31 further comprising broadcasting a video feed responsive to detecting the occurrence of the event.

39. The method of claim 31 further comprising broadcasting an audio feed responsive to detecting the occurrence of the event.

40. The method of claim 31 further comprising further comprising decoding a coded signal in the broadcast media feed.

* * * * *